(12) United States Patent
Mizuno et al.

(10) Patent No.: US 7,877,188 B2
(45) Date of Patent: Jan. 25, 2011

(54) CONTROL SYSTEM FOR INTERNAL COMBUSTION ENGINE AND CONTROL METHOD FOR INTERNAL COMBUSTION ENGINE

(75) Inventors: Hiroyuki Mizuno, Toyota (JP); Naoya Okubo, Toyota (JP)

(73) Assignee: Toyota Jidosha Kabushiki Kaisha, Toyota-Shi (JP)

( * ) Notice: Subject to any disclaimer, the term of this patent is extended or adjusted under 35 U.S.C. 154(b) by 99 days.

(21) Appl. No.: 12/465,194

(22) Filed: May 13, 2009

(65) Prior Publication Data
US 2009/0287390 A1 Nov. 19, 2009

(30) Foreign Application Priority Data
May 13, 2008 (JP) ............................. 2008-126257

(51) Int. Cl.
G06F 19/00 (2006.01)
G01F 9/02 (2006.01)
G01M 15/02 (2006.01)
F02D 45/00 (2006.01)

(52) U.S. Cl. .................... 701/102; 701/113; 73/114.54; 340/438

(58) Field of Classification Search ............ 123/179.16, 123/491, 494; 701/101–103, 110, 113, 115; 73/114.38, 114.54, 305–308; 702/55, 190–193; 340/438, 439
See application file for complete search history.

(56) References Cited
U.S. PATENT DOCUMENTS
3,942,499 A * 3/1976 Kunik et al. ................ 123/518

6,640,762 B2 * 11/2003 Ansaldi et al. ......... 123/179.16
7,013,844 B2 * 3/2006 Oda ............................. 123/3
7,117,729 B2 * 10/2006 Hosoya et al. ........... 73/114.54
2009/0276141 A1 * 11/2009 Surnilla et al. .............. 701/103

FOREIGN PATENT DOCUMENTS

| EP | 1519161 A2 * | 3/2005 |
|---|---|---|
| JP | 09296753 A | 11/1997 |
| JP | 2000008983 A A | 1/2000 |
| JP | 2000213406 A A | 8/2000 |
| JP | 2003028000 A | 1/2003 |
| JP | 2003329303 A * | 11/2003 |
| JP | 2004203156 A A | 7/2004 |
| JP | 2005016474 A A | 1/2005 |
| JP | 2005180376 A A | 7/2005 |
| JP | 2005262905 A A | 9/2005 |
| JP | 2007010574 | 1/2007 |

* cited by examiner

*Primary Examiner*—Willis R Wolfe, Jr.
(74) *Attorney, Agent, or Firm*—Gifford, Krass, Sprinkle, Anderson & Citkowski, P.C.

(57) ABSTRACT

A control system for an internal combustion engine includes: a fuel amount detector; a smoothing calculation unit that calculates a smooth output value, which is obtained by smoothing an output value of the fuel amount detector in a temporal direction; a continuous low speed condition detection unit that detects a continuous low speed condition in which the vehicle speed remains in the low speed region continuously beyond a predetermined time period; a calculation processing unit that successively calculates a maximum value and a minimum value of the smooth output value; a reference setting unit that updates and stores a reference value in response to the engine stoppage and in accordance with the current minimum value calculated by the calculation processing unit; and a fuel supply determination unit that detects a fuel supply to the fuel tank during the continuous low speed condition.

5 Claims, 7 Drawing Sheets

F I G . 7
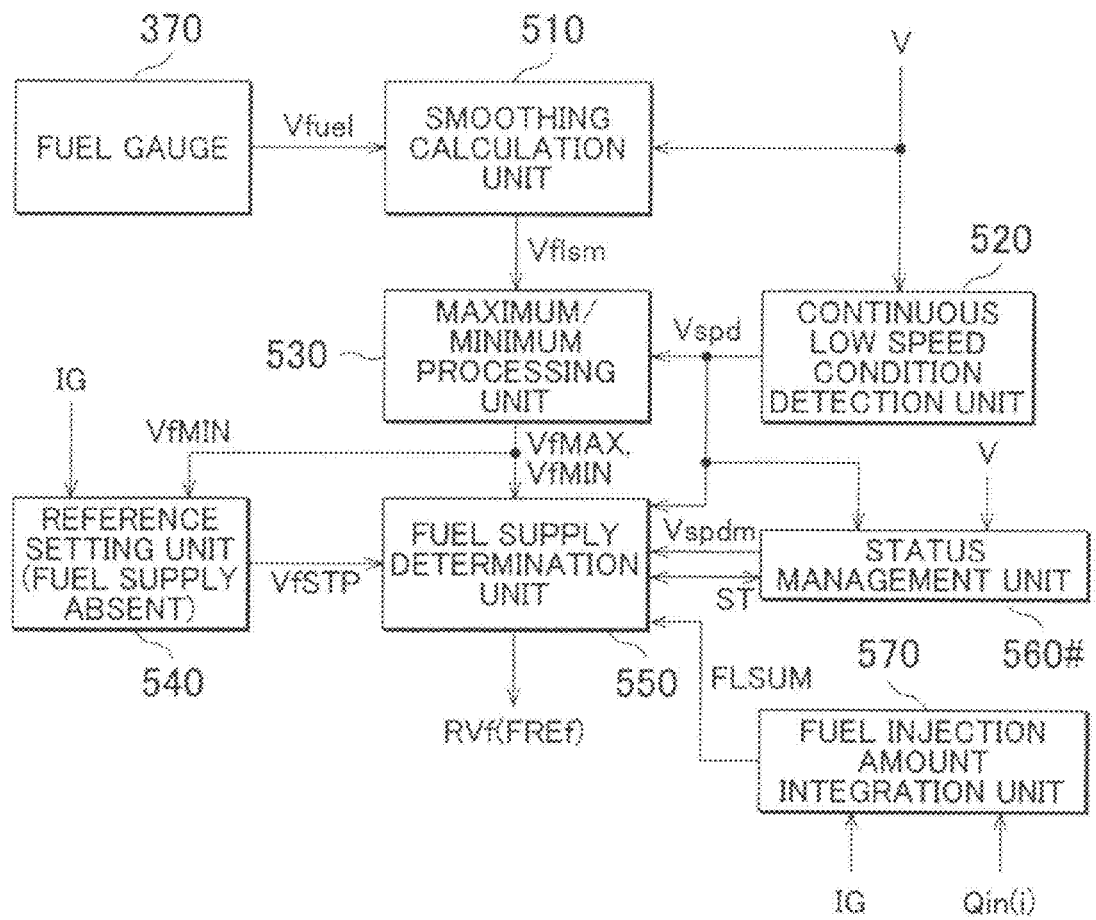
F I G . 8
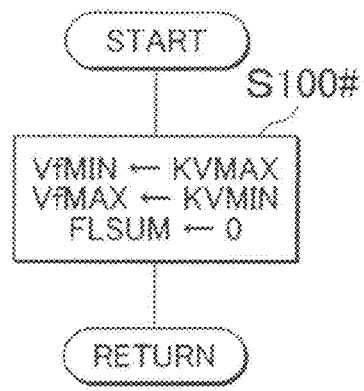

CONTROL SYSTEM FOR INTERNAL COMBUSTION ENGINE AND CONTROL METHOD FOR INTERNAL COMBUSTION ENGINE

INCORPORATION BY REFERENCE

The disclosure of Japanese Patent Application No. 2008-126257, filed on May 13, 2008, including the specification, drawings and abstract, is incorporated herein by reference in its entirety.

BACKGROUND OF THE INVENTION

1. Field of the Invention

The invention relates to a control system for an internal combustion engine and a control method for an internal combustion engine, and more particularly to a technique for detecting a fuel supply to a fuel tank.

2. Description of the Related Art

In a control system for an internal combustion engine, a remaining fuel amount is detected on the basis of an output of a fuel gauge provided in a fuel tank. The presence of a fuel supply to the fuel tank may then be determined as a part of engine control.

For example, Japanese Patent Application Publication No. 2007-10574 (JP-A-2007-10574) describes a breakdown diagnosis device for a fuel level gauge which outputs a voltage corresponding to a fuel level of a fuel tank. In this device, when diagnosing an abnormality in the fuel level gauge in accordance with a correlation between an output of the fuel level gauge and a fuel injection amount integrated value, a plurality of determination values of the fuel injection amount integrated value are provided in accordance with the fuel level as triggers for mediating the abnormality determination. In JP-A-2007-10574, initialization processing is performed on the fuel injection amount integrated value when fuel is supplied, as well as when a battery is cleared and when a diagnosis is completed, and therefore the presence of a fuel supply must be determined.

JP-A-2007-10574 describes a fuel supply detection method in which the presence of a fuel supply is determined on the basis of a determination as to whether or not a difference between a fuel level average value at the time of engine stoppage and a fuel level average value at the time of engine start-up exceeds a fuel supply determination value.

However, in the fuel supply detection method described in JP-A-2007-10574, the fuel level average value at the time of engine stoppage is determined as a reference value corresponding to a case in which a fuel supply is absent, and it may therefore be impossible to determine the presence of a fuel supply accurately depending on operating conditions at the start and end of a vehicle operation.

More specifically, in a case where the vehicle is stopped suddenly such that the engine is stopped rapidly, the fuel level average value at the time of engine stoppage is determined with the fuel level in an unstable condition, and it may therefore be impossible to set the reference value accurately. Furthermore, it is impossible to detect a condition in which the engine is not stopped and fuel continues to be supplied with the engine in an idling condition. Moreover, when the vehicle is caused to advance rapidly immediately after engine start-up, the fuel level of the fuel tank becomes unstable, and therefore an erroneous determination may be made.

SUMMARY OF THE INVENTION

The invention provides a control system for an internal combustion engine and a control method for an internal combustion engine with which a fuel supply to a fuel tank can be detected accurately on the basis of an output of a fuel gauge provided in the fuel tank.

A first aspect of the invention relates to a control system for an internal combustion engine. The control system for an internal combustion engine includes: a fuel amount detector; a smoothing calculation unit; a continuous low speed condition detection unit; a calculation processing unit; a reference setting unit; and a fuel supply determination unit. The fuel amount detector detects a remaining fuel amount in a fuel tank. The smoothing calculation unit calculates a smooth output value, which is obtained by smoothing an output value of the fuel amount detector in a temporal direction, when a vehicle speed is in a lower speed region than a predetermined speed. The continuous low speed condition detection unit detects a continuous low speed condition in which the vehicle speed remains in the low speed region continuously beyond a predetermined time period. The calculation processing unit successively calculates a maximum value and a minimum value of the smooth output value throughout the continuous low speed condition from an engine start-up to an engine stoppage. The reference setting unit updates and stores a reference value in response to the engine stoppage and in accordance with the current minimum value calculated by the calculation processing unit. The fuel supply determination unit detects a fuel supply to the fuel tank during the continuous low speed condition on the basis of a comparison between the maximum value calculated by the calculation processing unit and the reference value stored by the reference setting unit.

The reference setting unit may update and store the reference value in accordance with the current minimum value calculated by the calculation processing unit in response to an ignition switch being switched OFF, and the calculation processing unit may temporarily initialize the maximum value and the minimum value in response to the ignition switch being switched ON.

According to the control system for an internal combustion engine described above, the reference value for determining a fuel supply is set on the basis of the minimum value of the fuel amount detector output throughout a condition in which the vehicle speed remains in the lower speed region (a substantially stopped condition) than the predetermined speed beyond the predetermined time period during an operation, or in other words a condition in which a fuel level is estimated to be stable, and a fuel supply can be detected on the basis of a comparison between the reference value and the maximum value. Therefore, a fuel supply can be detected accurately using the fuel amount detector output in a condition where the fuel level is stable, without influence from vehicle operating conditions at the start and end of the operation.

The fuel supply determination unit may detect a fuel supply to the fuel tank on the basis of a comparison between the maximum value and the minimum value calculated by the calculation processing unit when the continuous low speed condition is detected after the vehicle speed has temporarily reached or exceeded the predetermined speed following the engine start-up.

Thus, when fuel is supplied without stopping the engine such that the reference value cannot be updated normally by the reference setting unit, the minimum value of the smooth output value is updated to reflect fuel consumption, and as a result, the fuel supply detection determination can be executed during the continuous low speed condition in a subsequent vehicle operation.

The fuel supply determination unit may detect a fuel supply to the fuel tank on the basis of a comparison between the current output value of the fuel amount detector and the reference value stored by the reference setting unit when the vehicle speed reaches or exceeds the predetermined speed before the continuous low speed condition is detected.

Thus, when the continuous low speed condition cannot be secured at the start of an operation due to rapid advancement following engine start-up or the like, the fuel supply detection determination can be executed in a backup fashion during the vehicle operation.

The control system further includes an integration unit that integrates a fuel injection amount during an operation. When the continuous low speed condition is detected after the vehicle speed has reached or exceeded the predetermined speed following the engine start-up before the continuous low speed condition is detected, the fuel supply determination unit may correct the maximum value calculated by the calculation processing unit using a fuel injection amount integrated value calculated by the integration unit, and detect a fuel supply to the fuel tank on the basis of a comparison between the corrected maximum value and the reference value stored by the reference setting unit.

Thus, when the continuous low speed condition cannot be secured at the start of an operation due to immediate vehicle advancement following engine start-up, the fuel supply detection determination can be executed using a stoppage timing (a low speed condition) in a subsequent vehicle operation.

A second aspect of the invention relates to a control method for an internal combustion engine. This control method for an internal combustion engine includes: detecting a remaining fuel amount in a fuel tank; calculating a smooth output value, which is obtained by smoothing the detected remaining fuel amount in a temporal direction, when a vehicle speed is in a lower speed region than a predetermined speed; detecting a continuous low speed condition in which the vehicle speed remains in the low speed region continuously beyond a predetermined time period; successively calculating a maximum value and a minimum value of the smooth output value throughout the continuous low speed condition from an engine start-up to an engine stoppage; updating and storing a reference value in response to the engine stoppage and in accordance with the current minimum value; and detecting a fuel supply to the fuel tank during the continuous low speed condition on the basis of a comparison between the maximum value and the reference value.

According to the control system for an internal combustion engine and the control method for an internal combustion engine of the respective aspects of the invention, a fuel supply to a fuel tank can be detected accurately on the basis of an output of a fuel gauge provided in the fuel tank.

BRIEF DESCRIPTION OF THE DRAWINGS

The foregoing and further features and advantages of the invention will become apparent from the following description of example embodiments with reference to the accompanying drawings, wherein like numerals are used to represent like elements, and wherein:

FIG. 7 is a functional block diagram illustrating the constitution of a fuel supply determination system in a control system for an internal combustion engine according to a third embodiment of the invention;

FIG. 8 is a first flowchart showing a control processing procedure executed by the fuel supply determination system shown in FIG. 7.

DETAILED DESCRIPTION OF EMBODIMENTS

Figure 1:
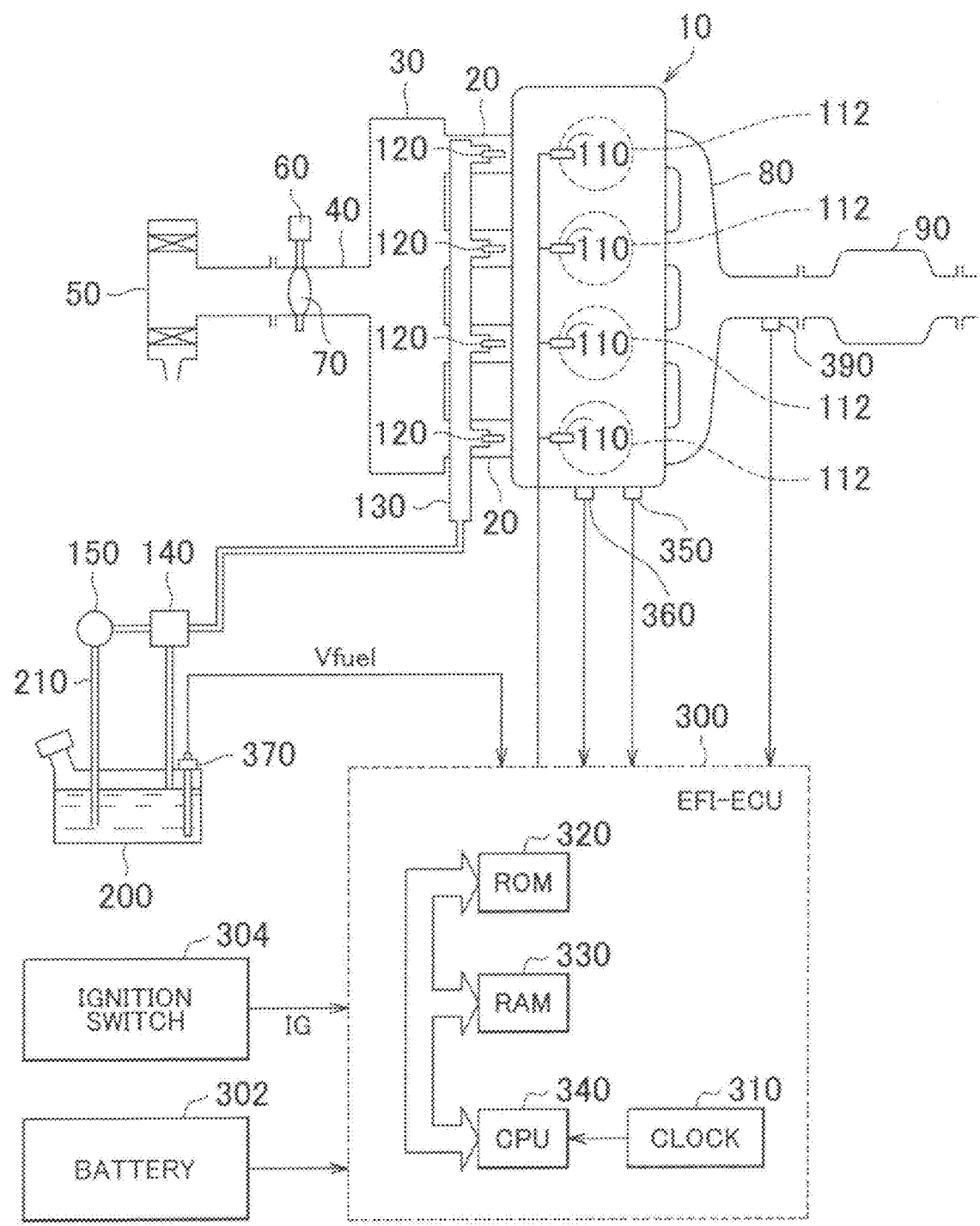
FIG. 1 is a schematic constitutional diagram of a control system for an internal combustion engine according to a first embodiment of the invention.

Embodiments of the invention will be described in detail below with reference to the drawings. Note that hereafter, identical or corresponding parts in the drawings have been allocated identical reference symbols, and as a rule, description thereof is not repeated.

First Embodiment

FIG. 1 is a schematic constitutional diagram of a control system for an internal combustion engine according to a first embodiment of the invention. Note that although FIG. 1 shows a straight four-cylinder gasoline engine as an engine, the invention is not limited to this type of engine, and may be applied to various types of engine, including a V-type six-cylinder engine and a V-type eight-cylinder engine.

Referring to FIG. 1, an engine 10 is an internal combustion engine that is driven by a fuel containing alcohol (ethanol) in addition to gasoline, for example. The engine 10 has four cylinders 112, and each cylinder 112 is connected to a shared surge tank 30 via a corresponding intake manifold 20. The surge tank 30 is connected to an air cleaner 50 via an intake duct 40. A throttle valve 70 driven by an electric motor 60 is disposed in the intake duct 40. The cylinders 112 are connected to a shared exhaust manifold 80, and the exhaust manifold 80 is connected to a three-way catalytic converter 90.

Each cylinder 112 is provided with a spark plug 110, and an injector 120 that injects fuel toward an intake port and/or an intake passage. The spark plug 110 and the injector 120 are controlled on the basis of an output signal from an Electronic Fuel Injection (EFI)-Electronic Control Unit (ECU) 300.

The injectors 120 are connected to a delivery pipe 130, and the delivery pipe 130 is connected to an electric motor-driven fuel pump 150 via a fuel pressure regulator 140. When the fuel pressure of fuel ejected from the fuel pump 150 increases beyond a predetermined set fuel pressure, the fuel pressure regulator 140 returns a part of the fuel ejected from the fuel pump 150 to a fuel tank 200, thereby preventing the pressure of the fuel supplied to the injectors 120 from exceeding the set fuel pressure.

A pipe 210 connected to the fuel pump 150 is inserted into the fuel tank 200. The fuel pump 150 aspirates the fuel in the fuel tank 200 through the pipe 210. As a rotation speed of the fuel pump 150 increases, the fuel aspiration amount increases.

The EFI-ECU 300 is constituted by a digital computer, and includes a clock 310, a Read Only Memory (ROM) 320, a Random Access Memory (RAM) 330, and a Central Processing Unit (CPU) 340. Alternatively, a part of the EFI-ECU 300 may be constituted by hardware (an electronic circuit).

An output voltage of a water temperature sensor 350 is input into the EFI-ECU 300. The water temperature sensor 350 generates an output voltage proportionate to a temperature (water temperature) of engine cooling water. Further, the EFI-ECU 300 inputs a signal from a rotation speed sensor 360 that generates an output pulse representing an engine rotation speed.

Further, an air-fuel ratio sensor 390 that generates an output voltage proportionate to an oxygen concentration of an exhaust gas is attached to the exhaust manifold 80 upstream of the three-way catalytic converter 90. The output voltage of the air-fuel ratio sensor 390 is input into the EFI-ECU 300. Note that the air-fuel ratio sensor 390 is a universal air-fuel ratio sensor (linear air-fuel ratio sensor) that generates an output voltage proportionate to the air-fuel ratio of an air-fuel mixture burned by the engine 10. An $O_2$ sensor that detects whether the air-fuel ratio of the air-fuel mixture burned by the engine 10 is richer or leaner than the stoichiometric air-fuel ratio in an ON/OFF fashion may be used as the air-fuel ratio sensor 390.

A fuel gauge (fuel amount detector) 370 for detecting a remaining fuel amount of the fuel tank 200 is provided in the fuel tank 200. An output signal Vfuel of the fuel gauge 370 indicates a voltage corresponding to the remaining fuel amount of the fuel tank 200, and is input into the EFI-ECU 300. To simplify the following description, a value indicated by the output signal Vfuel will be referred to as a fuel gauge output Vfuel.

HG 2 is a schematic block diagram illustrating the constitution of a system for determining the presence of a fuel supply in the control system for an internal combustion engine according to the first embodiment of the invention. Hereafter, the fuel supply to the fuel tank 200 will be referred to simply as a "fuel supply", and the determination regarding the presence or absence of a fuel supply will be referred to as a "fuel supply determination".

Figure 2:
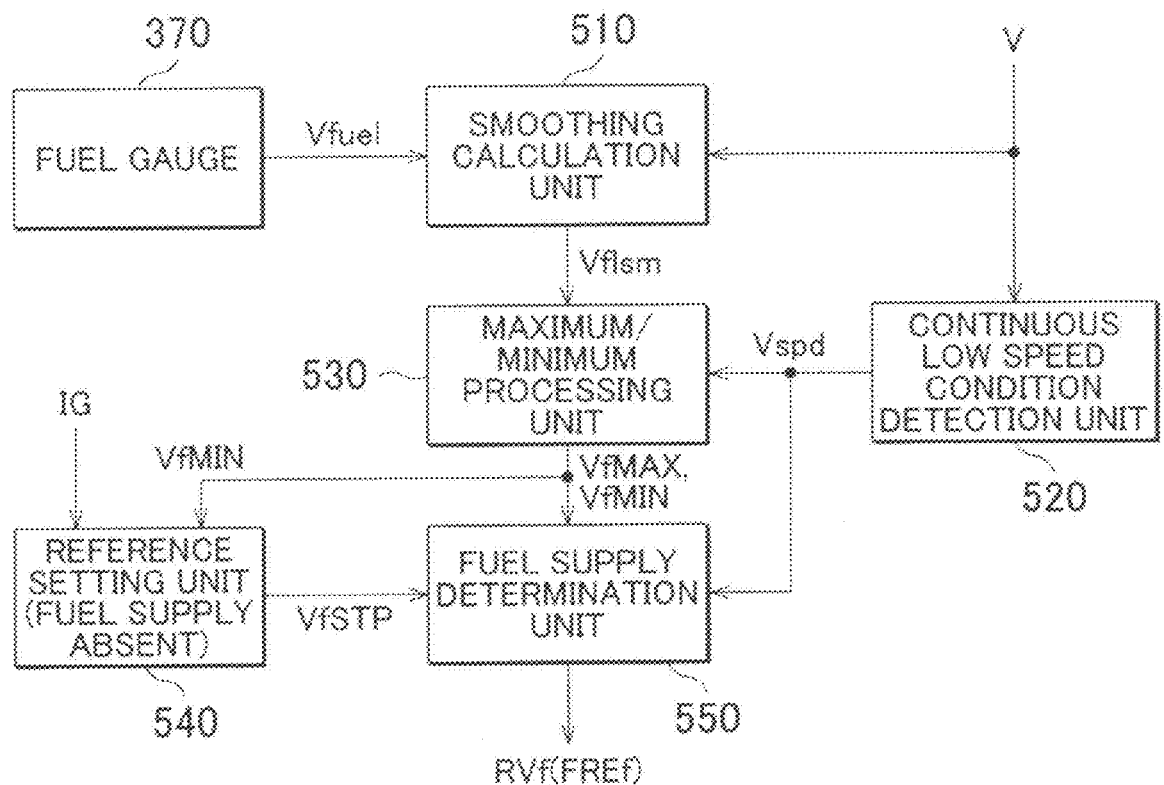
FIG. 2 is a functional block diagram illustrating the constitution of a fuel supply determination system in the control system for an internal combustion engine according to the first embodiment of the invention.

Referring to FIG. 2, a fuel supply determination system 500 includes a smoothing calculation unit 510, a continuous low speed condition detection unit 520, a maximum/minimum processing unit 530, a reference setting unit 540, and a fuel supply determination unit 550. Note that each of the function blocks to be described in subsequent functional block diagrams, including the function blocks 510 to 550 shown in FIG. 2, may be constituted by circuits (hardware) having functions corresponding to the blocks and provided in the EFI-ECU 300 shown in FIG. 1, or may be realized by having the EFI-ECU 300 execute software processing in accordance with a preset program.

The smoothing calculation unit 510 calculates a smooth gauge output Vflsm in accordance with a vehicle speed V detected by a vehicle speed sensor, not shown in the drawings, by smoothing the fuel gauge output Vfuel from the fuel gauge 370 in a temporal direction when the vehicle speed V is lower than a predetermined determination speed. By smoothing the fuel gauge output Vfuel in the temporal direction, a value of the fuel gauge output Vfuel in a condition where a fuel level of the fuel tank 200 is stable can be calculated appropriately, even when variation occurs in the output value of the fuel gauge output Vfuel due to an external disturbance (noise). The temporal direction smoothing calculation is executed in accordance with the following equation (1), for example.

$$Vflsm = Vflsm' + (Vfuel - Vflsm')/n \qquad (1)$$

In Equation (1), Vflsm' denotes a previous smooth gauge output, and n denotes a predetermined coefficient (n>1). As n increases, the degree by which the smooth gauge output Vflsm reflecting the fuel gauge output Vfuel is updated decreases, leading to an increase in the degree of temporal direction smoothing. As n increases, the effect of short-term variation in the fuel gauge output Vfuel decreases, and therefore the remaining fuel amount indicated by the fuel gauge output Vfuel can be caused to reflect a smoothed value. By means of this smoothing processing, erroneous determination of the fuel gauge output Vfuel due to noise can be prevented.

The continuous low speed condition detection unit 520 switches a vehicle speed flag Xspd OFF in a continuous low speed condition, i.e. when the low speed condition described above continues for at least a predetermined determination time period. The vehicle speed flag Xspd is switched ON at all times other than the continuous low speed condition. When the vehicle speed flag Xspd is switched OFF, it is assumed that the fuel level of the fuel tank 200 is in a stable condition. In other words, the determination speed and determination time period are set such that the vehicle speed flag Xspd is switched OFF when a condition in which the vehicle is substantially stationary (i.e. the low speed condition) continues for a fixed time period (preferably around several seconds).

The maximum/minimum processing unit 530 calculates a maximum value VFMAX and a minimum value VFMIN of the smooth gauge output Vflsm calculated by the smoothing calculation unit 510 throughout the period in which the vehicle speed flag Xspd is switched OFF (the continuous low speed condition). In other words, when the vehicle speed flag Xspd is ON, the maximum value VfMAX and minimum value VFMIN are not updated, regardless of the smooth gauge output Vflsm. Accordingly, the maximum/minimum processing unit 530 corresponds to a "calculation processing unit".

The maximum value VFMAX and minimum value VFMIN of the smooth gauge output are temporarily cleared in response to engine start-up, or in other words when an ignition switch is switched ON. As a result, the maximum value VFMAX and minimum value VFMIN indicate a maximum value and a minimum value of the smooth gauge output Vflsm throughout the continuous low speed condition, or in other words the period in which the fuel level of the fuel tank 200 is stable.

The remaining fuel amount of the fuel tank 200 decreases steadily as fuel is injected during an operation, and therefore, the maximum value VfMAX basically corresponds to the smooth gauge output Vflsm at the time of engine start-up. Hence, when fuel is supplied during vehicle stoppage, the maximum value VfMAX indicates the remaining fuel amount in a condition where the amount of fuel has increased due to the fuel supply. Meanwhile, the minimum value VFMIN corresponds to the smooth gauge output Vflsm at the time of engine stoppage. In other words, the minimum value VFMIN indicates a remaining fuel amount reflecting fuel consumption during an operation period.

The reference setting unit 540 stores the minimum value VfMIN of the smooth gauge output during the operation period as a reference value VfSTP to be used in the next fuel supply determination when an ignition signal IG indicating the ON/OFF condition of an ignition switch 304 shifts from ON to OFF. The reference value VfSTP corresponds to the remaining fuel amount of the fuel tank 200 at the time of engine stoppage. The reference setting unit 540 updates and stores the reference value VfSTP in this manner every time the engine is stopped. The stored reference value VfSTP is used in a subsequent fuel supply determination as a value (a reference value) corresponding to the remaining fuel amount when fuel is not supplied at the time of engine start-up.

When the maximum value VFMAX of the smooth gauge output is updated by the maximum/minimum processing unit 530 while the vehicle speed flag Xspd is switched OFF (in the continuous low speed condition), the fuel supply determination unit 550 determines the presence of a fuel supply on the basis of a comparison between the updated maximum value VFMAX and the reference value VfSTP stored in the reference setting unit 540. The fuel supply determination unit 550 corresponds to a "fuel supply determination unit".

For example, the fuel supply determination unit 550 determines the presence of a fuel supply by calculating a fuel increase rate RVf (RVf=VfMAX/VfSTP). When the fuel increase rate RVf is greater than a predetermined value, a fuel supply determination flag FREf is switched ON. Alternatively, the determination performed by the fuel supply determination unit 550 may limit at calculation of the fuel increase rate RVf.

Next, a control processing procedure executed by the fuel supply determination system shown in FIG. 2 will be described using the flowcharts in FIG. 3 and FIG. 4.

Figure 3:
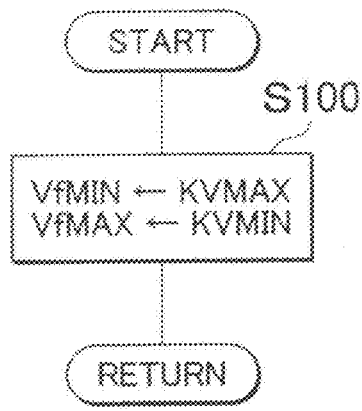
FIG. 3 is a first flowchart showing a control processing procedure executed by the fuel supply determination system shown in FIG. 2.

Referring to FIG. 3, in a step S100, the EFI-ECU 300 initializes the maximum value VFMAX and the minimum value VFMIN of the smooth gauge output calculated by the maximum/minimum processing unit 530 shown in FIG. 2. More specifically, an initial value of the minimum value VFMIN is set at KVMAX, which corresponds to a maximum value of a variation range of the fuel gauge output Vfuel, and the maximum value VFMAX is set at KVMIN, which corresponds to a minimum value of the variation range of the fuel gauge output Vfuel.

Note that the processing shown in the flowchart of FIG. 3 is executed as initialization processing when the EFI-ECU 300 is activated by switching the ignition switch 304 ON. In contrast, the processing shown in HG 4 is executed repeatedly by the EFI-ECU 300 at predetermined intervals during an operation.

Figure 4:
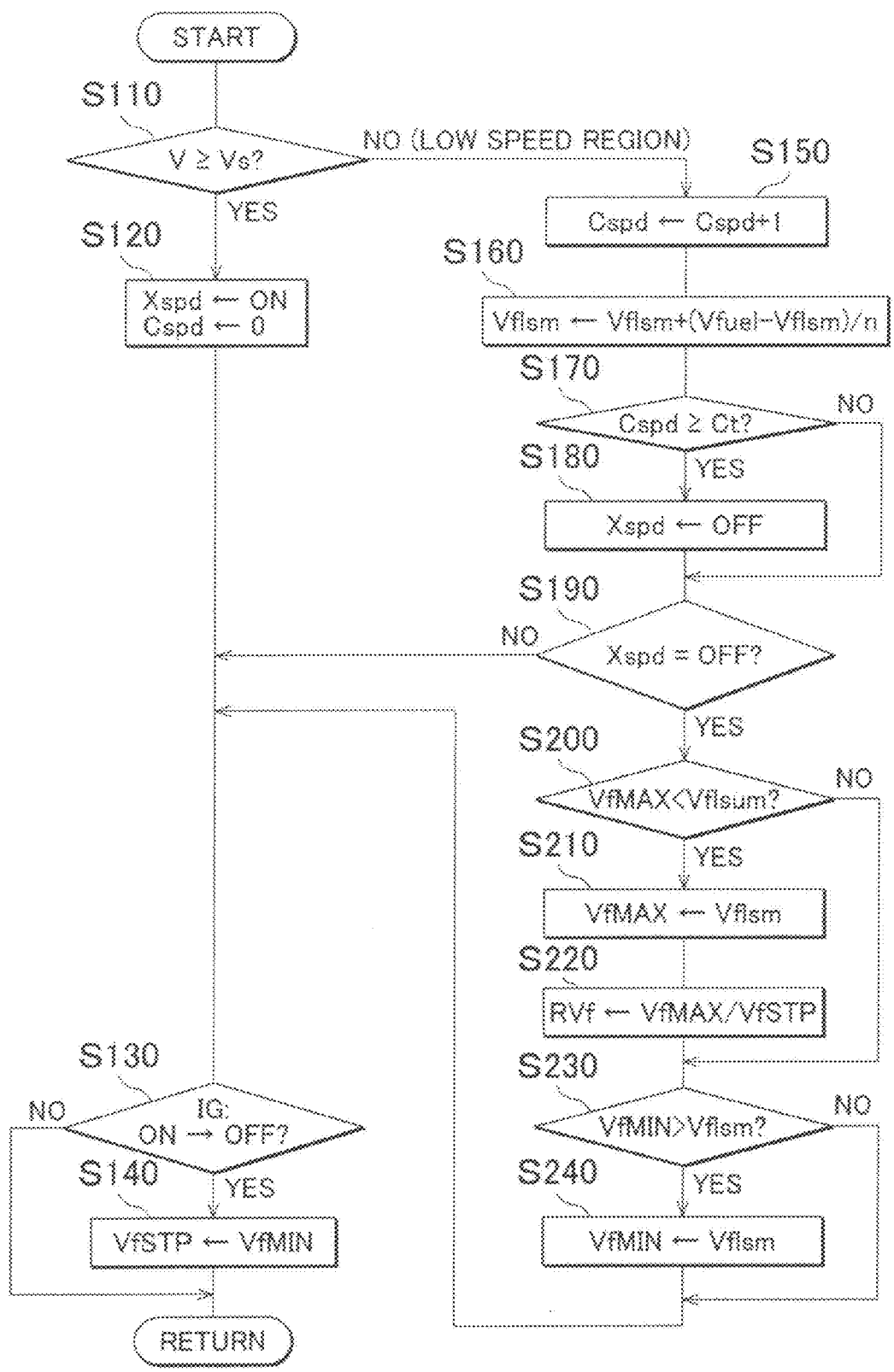
FIG. 4 is a second flowchart showing the control processing procedure executed by the fuel supply determination system shown in HG 2.

Referring to FIG. 4, in a step S110, the EFI-ECU 300 determines whether or not a low speed condition is present by comparing the vehicle speed V to a determination speed Vs. When V≧Vs (YES in S110), or in other words during vehicle travel, the processing advances to a step S120. In step S120, the vehicle speed flag Xspd is switched ON and a count value Cspd for measuring the duration of the low speed condition is cleared to zero.

When V<Vs, on the other hand, or in other words when the low speed condition is present (NO in S110), the processing advances to a step S150, in which the EFI-ECU 300 increments the count value Cspd. The EFI-ECU 300 then calculates the smooth gauge output Vflsm in a step S160 by smoothing the fuel gauge output Vfuel in the temporal direction in accordance with Equation (1).

Further, in the low speed condition, the EFI-ECU 300 determines in a step S170 whether or not the count value Cspd has reached a determination value Ct. When the count value Cspd equals or exceeds Ct (YES in S170), the processing advances to a step S180, in which the EFI-ECU 300 switches the vehicle speed flag Xspd OFF. As described above, the determination speed Vs and the determination period Ct are set in advance on the basis of experiment results or the like such that when the vehicle speed flag Xspd is OFF, the fuel level of the fuel tank 200 is in a stable condition.

Further, in a step S190, the EFI-ECU 300 determines whether or not the vehicle speed flag Xspd is OFF. When the vehicle speed flag Xspd is OFF (YES in S190), or in other words when the fuel level is stable, the processing of the following steps S200 to S240 is executed.

As is evident from steps S150 to S190, in the low speed condition, the smooth gauge output Vflsm is calculated in step S160. In other words, the processing of step S160 corresponds to a function of the smoothing calculation unit 510 shown in FIG. 2. Further, the processing of steps S150, S170 and S180 corresponds to a function of the continuous low speed condition detection unit 520 shown in FIG. 2.

Note, however, that in addition to a non-low speed condition (V≧Vs), the vehicle speed flag Xspd is also ON (NO in S190) when the low speed condition is present but the duration thereof is shorter than a predetermined time period corresponding to the determination value Ct, and in this case, the processing of steps S200 to S240 is not executed.

When the EFI-ECU 300 detects that the ignition signal has shifted from ON to OFF in a step S130 (YES in S130), regardless of whether the vehicle speed flag Xspd is ON or OFF, the EFI-ECU 300 stores the minimum value VFMIN of the smooth gauge output at that point in time as the reference value VfSTP in a step S140. In other words, the reference value VfSTP is updated as a value corresponding to the remaining fuel amount at the time of engine stoppage every time IG OFF is established. Hence, the processing of step S140 corresponds to a function of the reference setting unit 540 shown in FIG. 2.

Next, the processing of steps S200 to S240, which is executed when the vehicle speed flag Xspd is OFF, will be described in detail.

When the vehicle speed flag Xspd is OFF (YES in S190), the EFI-ECU 300 advances the processing to step S200. In step S200, the smooth gauge output Vflsm calculated in step S160 is compared to the maximum value VFMAX of the smooth gauge output up to that point. When Vflsm>VFMAX (YES in S200), the EFI-ECU 300 executes steps S210 and S220. When Vflsm≦VfMAX (NO in S200), on the other hand, the EFI-ECU 300 skips the processing of steps S210 and S220.

In step S210, the EFI-ECU 300 updates the smooth gauge output maximum value VFMAX in accordance with the smooth gauge output Vflsm. Further, after updating the maximum value VFMAX, the EFI-ECU 300 calculates the fuel increase rate RVf, which is a ratio between the updated maximum value VfMAX and the reference value VfSTP, in step S220. As described above, the reference value VfSTP is a value corresponding to the remaining fuel amount at the time of the previous engine stoppage, which is set in step S140 in response to the previous IG OFF operation.

In steps S230 and S240, the EFI-ECU 300 performs update processing on the smooth gauge output minimum value VFMIN. More specifically, in step S230, the smooth gauge output Vflsm calculated in step S160 is compared with the smooth gauge output minimum value VFMIN up to that point. When Vflsm<VFMIN (YES in S230), the EFI-ECU 300 updates the smooth gauge output minimum value VfMIN in accordance with the smooth gauge output Vflsm in step S240. When Vflsm≧VfMIN (NO in S230), on the other hand, the processing of step S240 is skipped and the minimum value VFMIN is maintained.

A function of the maximum/minimum processing unit 530 shown in FIG. 2 is realized by the processing of steps S200, S210, S230 and S240 such that the maximum value VFMAX and the minimum value VFMIN of the smooth gauge output Vflsm are calculated successively when the continuous low speed condition is present during an operation period, or in other words while the fuel level of the fuel tank 200 is stable.

By calculating the fuel increase rate RVf in step S220, a function of the fuel supply determination unit 550 shown in FIG. 2 is realized.

The maximum value VFMAX and the minimum value VFMIN are only updated in the continuous low speed condition (when the vehicle speed flag Xspd is OFF), and do not therefore take unstable values that are influenced by vehicle operating conditions.

Hence, in the control system for an internal combustion engine according to the first embodiment of the invention, a fuel supply detection determination can be executed accurately on the basis of the reference value VfSTP, which is updated in accordance with the minimum value VFMIN every time the engine is stopped, and the maximum value VFMAX calculated during a subsequent engine operation. In particular, erroneous determinations due to the effects of the vehicle operating conditions can be prevented.

Second Embodiment

A prerequisite of the first embodiment is that fuel is supplied while the engine is stopped (while the ignition switch is OFF), but in actuality, a case in which the engine is held in an idling condition while the vehicle is stationary, or in other words a case in which fuel is supplied while the ignition switch remains ON, may also be envisaged.

In the second embodiment, a fuel supply determination system that can respond to this type of case will be described.

Note that in the embodiments to be described hereinafter, the constitution of the control system for an internal combustion engine is similar to that of the first embodiment, and only the fuel supply determination performed by the EFI-ECU 300 differs. Hence, in the following embodiments, including the second embodiment, differences with the first embodiment will be described, whereas points that are not described are assumed to be identical to their counterparts in the first embodiment.

Figure 5:
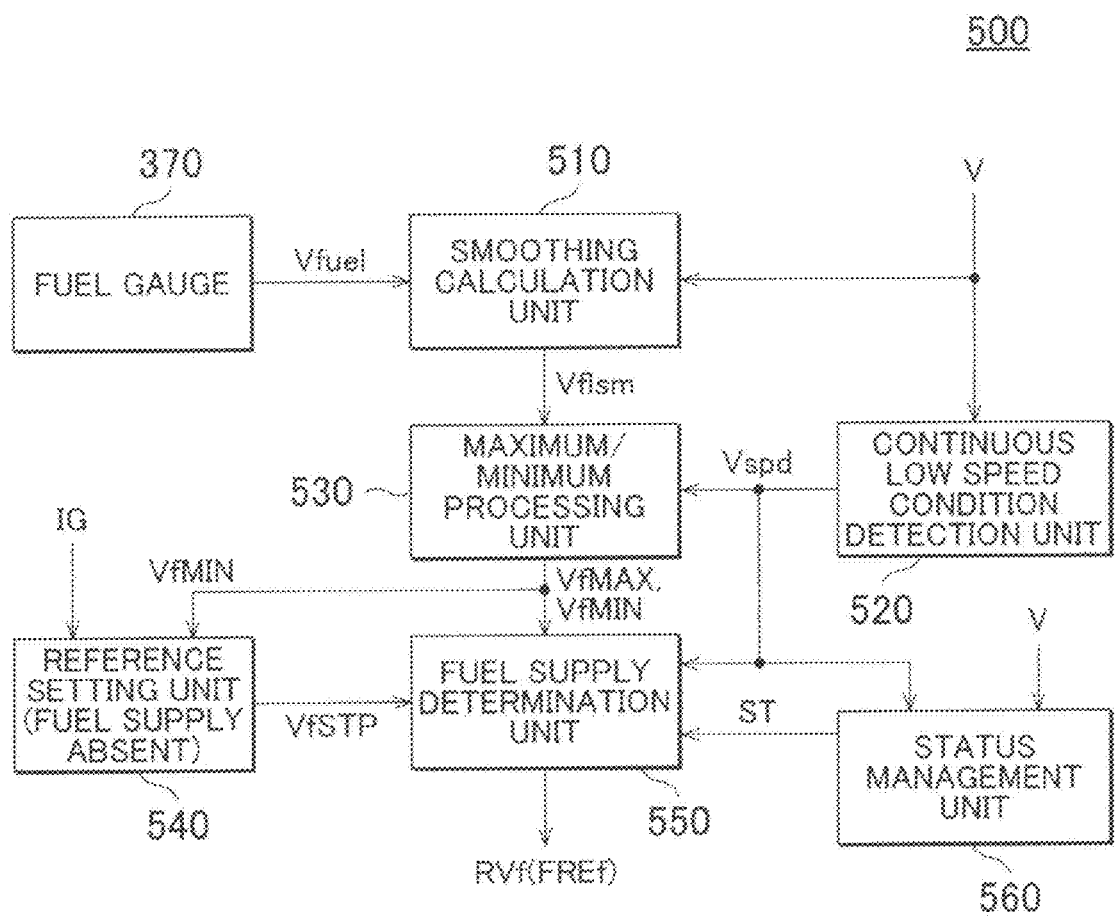
FIG. 5 is a functional block diagram illustrating the constitution of a fuel supply determination system in a control system for an internal combustion engine according to a second embodiment of the invention.

FIG. 5 is a functional block diagram illustrating the constitution of a fuel supply determination system in the control system for an internal combustion engine according to the second embodiment of the invention.

Referring to HG 5, the fuel supply determination system 500 according to the second embodiment includes a status management unit 560 in addition to the constitution shown in FIG. 2. The status management unit 560 manages a status ST, which is a variable indicating calculation of the fuel increase rate RVf upon detection of the continuous low speed condition (vehicle speed flag Xspd OFF), or in other words an execution condition relating to the fuel supply determination.

At the time of engine start-up, the status management unit 560 sets the value of the status ST to 0 (an initial value). Thereafter, the status management unit 560 switches the value of the status ST from 0 to 1 when calculation of the fuel increase rate RVf (the fuel supply determination) is executed on the basis of the reference value VfSTP. Further, when the vehicle speed V reaches or exceeds Vs from a condition in which the status ST=0 or 1, the value of the status ST is switched to 2. In other words, when the vehicle speed V reaches or exceeds Vs following engine start-up, the status ST takes a value of 2, and ST=2 is maintained until the engine is stopped.

Figure 6:
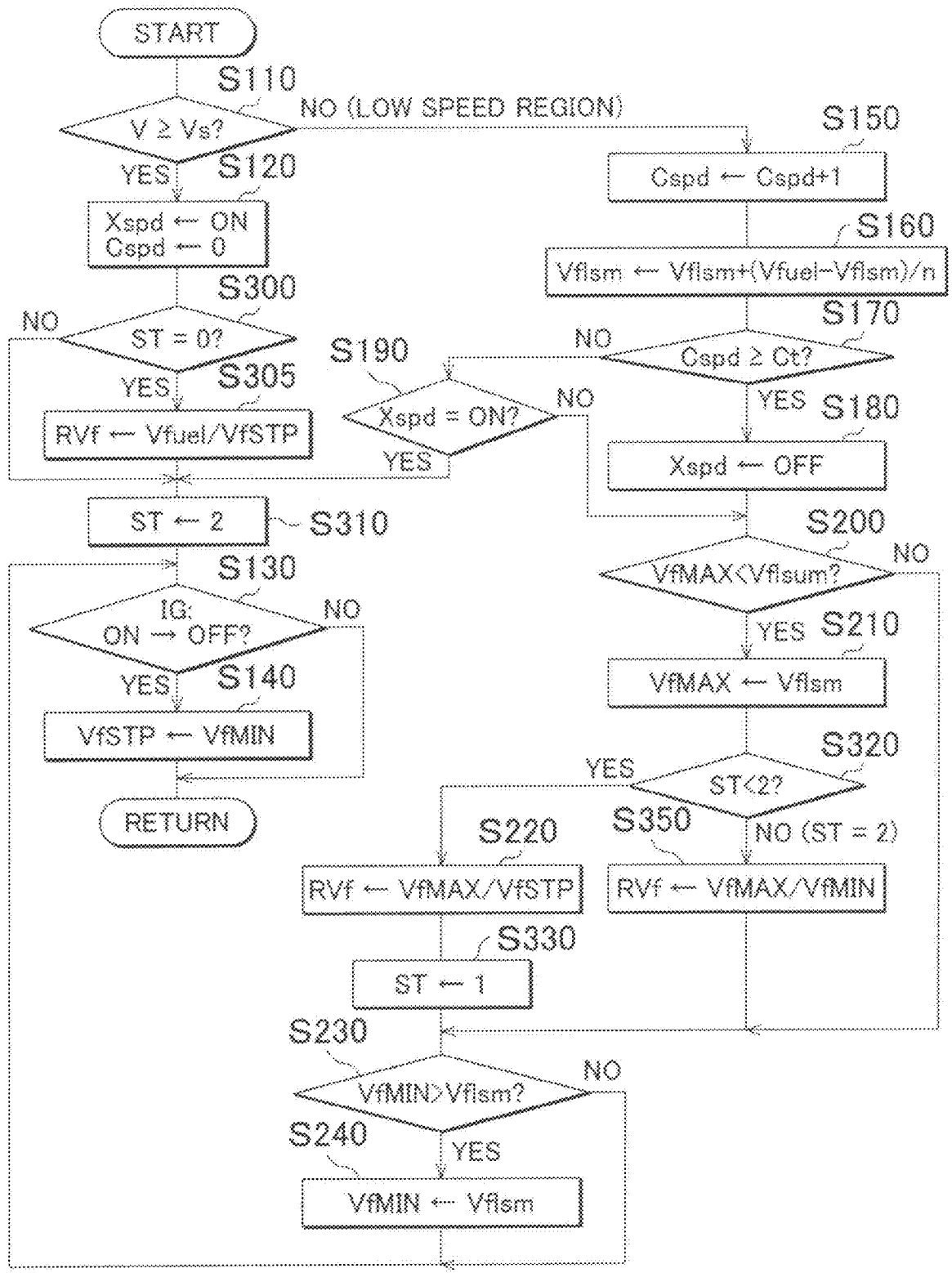
FIG. 6 is a second flowchart showing a control processing procedure executed by the fuel supply determination system shown in FIG. 5.

The fuel supply determination unit 550 modifies the manner in which the fuel increase rate RVf is calculated (the manner in which the fuel supply is determined) in accordance with the value of the status ST, as shown in FIG. 6.

Referring to FIG. 6, in the second embodiment, the EFI-ECU 300 performs the processing of steps S300, S310, S320 and S330 for managing the status ST in addition to the processing procedure shown in the flowchart of HG 4, and furthermore, when the fuel increase rate RVf cannot be calculated in step S220 of FIG. 4, the EFI-ECU 300 performs the processing of steps S305 and S350 for calculating the fuel increase rate RVf in backup form. In other words, the processing of steps S300, S310, S320 and S330 corresponds to a function of the status management unit 560 shown in FIG. 5, while a function of the fuel supply determination unit 550 (second embodiment) shown in FIG. 5 is realized by the processing of steps S220, S305 and S350.

When the vehicle is traveling at vehicle speed V≧Vs (YES in S110), the EFI-ECU 300 performs the processing of step S120 in a similar manner to FIG. 4, and then determines whether or not the status ST=0 in step S300. When ST=0 (YES in S300), the EFI-ECU 300 executes step S305 and sets status ST=2 in step S310. When ST≠0 (NO in S300), on the other hand, the EFI-ECU 300 sets status ST=2 in step S310 without performing the processing of step S305. In other words, when the vehicle temporarily moves out of the low speed condition following the start of an operation, ST=2 is set.

Note that when the vehicle begins to travel before an opportunity arises to calculate the fuel increase rate RVf in step S220 at the time of engine start-up, the status ST remains at 0 (the initial value), and therefore an affirmative determination is made in step S300, whereby an opportunity to perform the fuel supply determination in step S305, to be described below, is secured.

Meanwhile, when the smooth gauge output maximum value VfMAX is updated in step S210, which is executed under similar conditions to those of FIG. 4, during detection of the continuous low speed condition (vehicle speed flag Xspd OFF), the EFI-ECU 300 checks the value of the status ST in step S320 before executing step S220.

When the value of the status ST is 0 or 1 (YES in S320), the EFI-ECU 300 executes calculation of the fuel increase rate RVf (the fuel supply determination) based on the reference value VfSTP in step S220 and sets status ST=1 in step S330 to indicate that the fuel supply determination has been executed normally.

On the other hand, when the value of the status ST is 2 (NO in S320), the EFI-ECU 300 advances the processing to step S350. In step S350, the fuel increase rate RVf is calculated in accordance with the following equation (2) instead of calculating the fuel increase rate RVf in accordance with step S220.

$$RVf = VfMAX/VfMIN \qquad (2)$$

More specifically, when the continuous low speed condition is detected after vehicle speed V≧Vs has been established temporarily following the start of vehicle travel, thereby providing an opportunity to execute the fuel supply determination, the fuel supply determination is executed using the smooth gauge output minimum value VfMIN during the operation period instead of the reference value VfSTP indicating the remaining fuel amount at the time of the previous engine stoppage.

In a case where fuel is supplied while the vehicle is stationary but the engine remains active (i.e. an idling condition), the fuel increase rate RVf is calculated in accordance with step S350. In this case, the ignition switch is not OFF, and therefore updating of the reference value VfSTP is not executed in step S140. Accordingly, a fuel supply during vehicle stoppage (idling) cannot be detected in the fuel supply determination of step S220, in which the non-updated reference value VfSTP is used. Hence, by employing step S350, a determination of "fuel supply absent" in a case where fuel is supplied while the engine remains active (in an idling condition) can be prevented.

Note that when the vehicle speed flag Xspd is ON, the EFI-ECU 300 can secure an opportunity to calculate the fuel increase rate RVf in step S305. In step S305, the fuel increase rate RVf is calculated in accordance with the following equation (3).

$$RVf = Vfuel/VfSTP \tag{3}$$

As a result of the processing of step S305, a backup fuel supply determination can be executed on the basis of the fuel gauge output Vfuel even when a normal fuel supply determination cannot be executed in step S220. It may therefore be assumed that a fuel supply can be detected at the stage immediately following engine start-up by means of a fuel supply determination based on the current fuel gauge output Vfuel. Note that when calculation of the fuel increase rate RVf (the fuel supply determination) can be executed on the basis of the reference value VfSTP in step S220 at the time of engine start-up, ST=1 is set, and therefore a negative determination is made in step S300. Hence, calculation of the fuel increase rate RVf in accordance with step S305, as described above, is skipped.

When the fuel increase rate RVf is calculated (a fuel supply determination is executed) in step S305, output noise from the fuel gauge 370 has a relatively large effect. Hence, erroneous determinations may be prevented by smoothing the calculated fuel increase rate RVf in the temporal direction or detecting "fuel supply present" when a condition in which the fuel increase rate RVf exceeds a predetermined value continues for a fixed time period.

As described above, according to the control system for an internal combustion engine of the second embodiment, in addition to the effects of the control system for an internal combustion engine according to the first embodiment, an erroneous determination of "fuel supply absent" can be prevented when fuel is supplied while the engine remains active (in an idling condition). Further, even when the continuous low speed condition cannot be secured during engine start-up such that a normal fuel supply determination cannot be executed in step S220, a backup fuel supply determination based on the current fuel gauge output Vfuel can be executed at the stage immediately after engine start-up.

Third Embodiment

In the third embodiment, a control constitution with which the fuel supply determination can be executed using a timing at which the vehicle stops traveling in a case where the vehicle begins to advance immediately after the ignition switch is switched ON such that the continuous low speed condition cannot be secured will be described.

HG 7 is a functional block diagram illustrating the constitution of a fuel supply determination system in the control system for an internal combustion engine according to the third embodiment of the invention.

Referring to HG 7, the fuel supply determination system 500 according to the third embodiment includes, in addition to the constitution shown in FIG. 2, a status management unit 560# and a fuel injection amount integration unit 570.

With respect to the variable ST indicating the execution condition of the fuel supply determination, the status management unit 560# sets the value of the status ST to 0 (the initial value) at the time of engine start-up and switches the value of the status ST from 0 to 1 when calculation of the fuel increase rate RVf (the fuel supply determination) is executed on the basis of the reference value VfSTP. In other words, in the third embodiment, the value of the status ST is set to 0 or 1 by the status management unit 560#.

Further, when vehicle speed V≧Vs is established while status ST=0, the status management unit 560# switches a determination request flag Xspdm, which indicates that vehicle travel has begun without executing a normal fuel supply determination at the time of engine start-up, ON.

The fuel injection amount integration unit 570 integrates a fuel injection amount integrated value from activation of the EFI-ECU 300 to obtain an integrated value FLSUM.

The fuel injection amount integration unit 570 initializes (clears) the value of the integrated value FLSUM in response to IG ON, and during an operation period, the fuel injection amount integration unit 570 calculates the fuel injection amount integrated value FLSUM by successively integrating a fuel injection amount Qn(i) (where i indicates a cylinder number) at each of a plurality of points in time set successively in accordance with the operating conditions of the engine.

More specifically, as shown by the flowchart in FIG. 8, in the third embodiment, the EFI-ECU 300 executes a step S100# instead of step S100 shown in FIG. 3 as the initialization processing that is performed during activation, i.e. when the ignition switch 304 is switched ON.

In step S100#, the maximum value VFMAX and minimum value VFMIN of the smooth gauge output are initialized in a similar manner to step S100, and the fuel injection amount integrated value FLSUM is cleared to 0.

Figure 9:
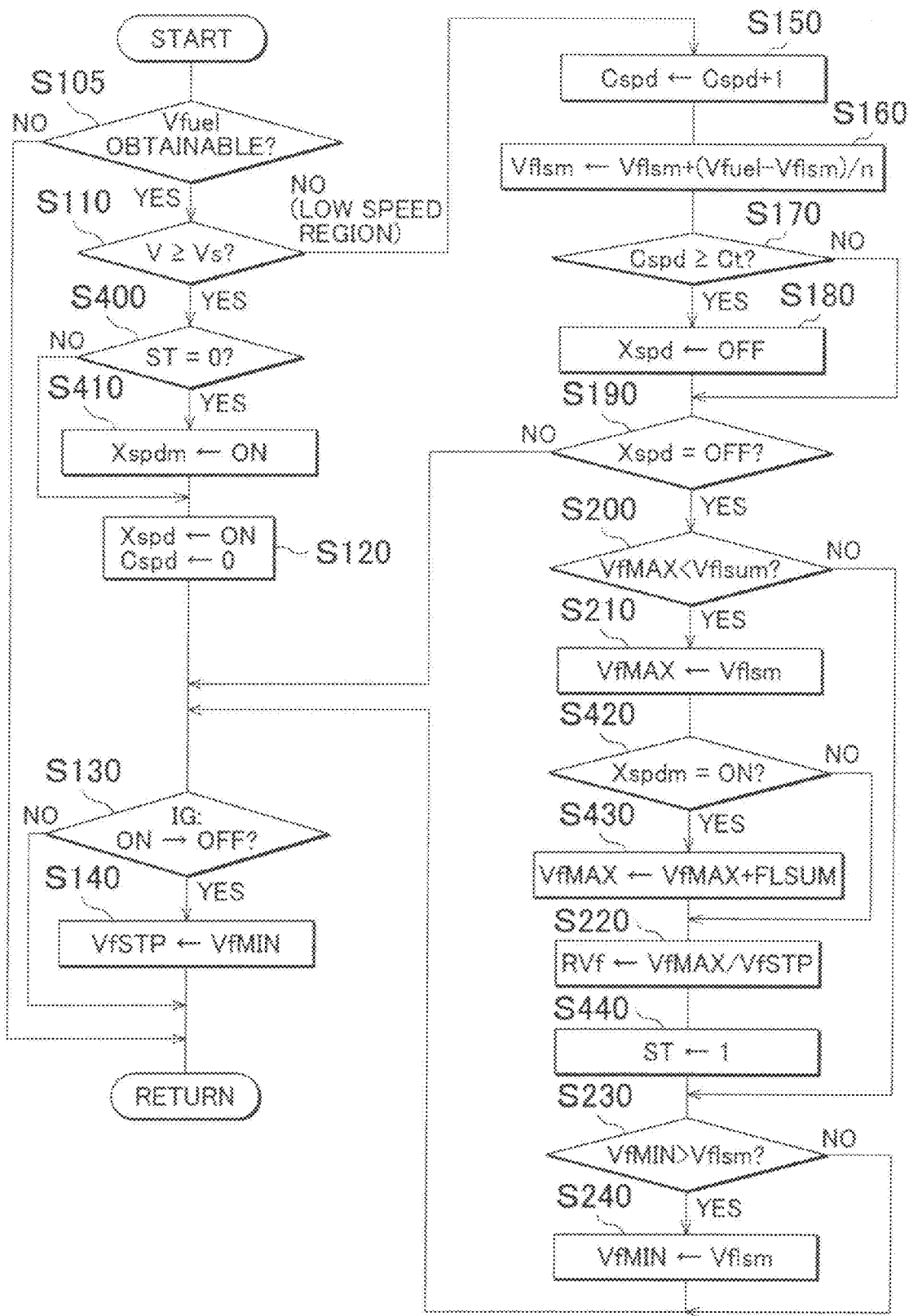
FIG. 9 is a second flowchart showing the control processing procedure executed by the fuel supply determination system shown in FIG. 7.

The fuel supply determination unit 550 then modifies the manner in which the fuel increase rate RVf is calculated (the manner in which the fuel supply determination is performed) in accordance with the value of the status ST and the determination request flag Xspdm, as shown in FIG. 9.

Referring to FIG. 9, in the third embodiment, the EFI-ECU 300 performs the processing of steps S400, S410 and S440 for managing the status ST and the determination request flag Xspdm and the processing of steps S420 and S430 for reflecting the fuel injection amount integrated value FLSUM in the fuel supply determination when the determination request flag Xspdm is ON in addition to the processing procedure shown in the flowchart of FIG. 4. In other words, the processing of steps S400, S410 and S440 corresponds to a function of the status management unit 560# shown in FIG. 7, while a function of the fuel supply determination unit 550 (third embodiment) shown in FIG. 7 is realized by the processing of steps S420 and S430.

In the constitution of the third embodiment, the EFI-ECU 300 executes a step S105 before step S110. In step S105, a determination is made as to whether or not the fuel gauge output Vfuel is obtainable. For example, immediately after the ignition switch 304 has been switched ON, a negative determination is made in step S105 due to a communication delay, output instability, and so on. Accordingly, an affirmative determination is made in step S105 when a predetermined amount of time has elapsed following IG ON.

When the vehicle is traveling at vehicle speed V≧Vs (YES in S110), steps S400 and S410 are executed. In step S400, the EFI-ECU 300 determines whether or not the value of the status ST is 0. When the status ST=0 (YES in S400), the EFI-ECU 300 switches the determination request flag Xspdm ON in step S410. When the status ST=1 (NO in S400), on the other hand, the EFI-ECU 300 skips the processing of step S410.

Further, when calculation of the fuel increase rate RVf (the fuel supply determination) is executed in step S220 under similar conditions to those of FIG. 4, the EFI-ECU 300 sets the value of the status ST at 1 in step S440.

As a result of the processing described above, the determination request flag Xspdm is switched ON when vehicle travel is begun without executing the fuel supply determination in a similar manner to the first embodiment (i.e. calculation of RVf in accordance with step S220).

On the other hand, when an opportunity arises to calculate the fuel increase rate RVf in accordance with step S220 at the time of engine start-up, the processing of step S410 is skipped following the start of vehicle travel, and therefore the determination request flag Xspdm is maintained at its initial value, i.e. OFF.

Of the processing performed by the EFI-ECU 300 in the low speed condition (NO in step S110), steps S150 to S240 are similar to their counterparts in FIG. 4. In the third embodiment, the EFI-ECU 300 executes steps S420, S430 before executing step S220 when the smooth gauge output maximum value VFMAX is updated in step S210, which is executed under similar conditions to those of FIG. 4.

In step S420, the EFI-ECU 300 determines whether or not the determination request flag Xspdm is ON. When the determination request flag Xspdm is OFF (NO in S420), step S410 is skipped and the fuel supply determination (calculation of the fuel increase rate RVf) is executed in step S220 using the maximum value VfMAX updated in step S210 and the reference value VfSTP. As described above, status ST=1 is set in step S440 in response to this execution of the fuel supply determination.

When the determination request flag Xspdm is ON (YES in S420), on the other hand, the EFI-ECU 300 corrects the smooth gauge output maximum value VFMAX updated in step S210 using the fuel injection amount integrated value FLSUM up to that point in step S430. At this time, the EFI-ECU 300 executes the fuel supply determination (calculation of the fuel increase rate RVf) in step S220 using the maximum value VFMAX corrected in step S430 and the reference value VfSTP.

Hence, when an opportunity to execute the fuel supply determination cannot be secured during engine start-up (when the determination request flag Xspdm is ON), the fuel supply determination can be performed using the timing at which the vehicle stops operating or the like. During this fuel supply determination, the amount of fuel consumed by the vehicle travel can be grasped by integrating the fuel injection amount, and by reflecting the grasped fuel consumption amount in the fuel supply determination, the determination can be made accurately.

Hence, according to the control system for an internal combustion engine of the third embodiment, in addition to the effects of the control system for an internal combustion engine according to the first embodiment, a fuel supply determination reflecting the amount of fuel consumed due to fuel injection up to the present time can be executed using the timing at which the vehicle stops traveling in a case where the vehicle advances rapidly after the ignition switch is switched ON such that a normal fuel supply determination cannot be executed at the time of engine start-up.

Note that in the first to third embodiments, the fuel supply determination is performed in accordance with the fuel increase rate RVf, which is the ratio between the maximum value VFMAX and the reference value VfSTP, but the fuel supply determination may be executed on the basis of a fuel increase (VfMAX−VfSTP), which is the difference between the maximum value VFMAX and the reference value VfSTP.

Further, it is assumed that in the first to third embodiments, the engine 10 is installed in a Flex Fuel Vehicle (FFV) in consideration of the fuel supply detection needs thereof, but the invention does not necessarily have to be applied to an FFV, and may in principle be applied to a determination regarding the presence or absence of a fuel supply in a normal gasoline engine.

While the invention has been described with reference to example embodiments thereof, it is to be understood that the invention is not limited to the described embodiments or constructions. On the other hand, the invention is intended to cover various modifications and equivalent arrangements. In addition, while the various elements of the disclosed invention are shown in various example combinations and configurations, other combinations and configurations, including more, less or only a single element, are also within the scope of the appended claims.

What is claimed is:

1. A control system for an internal combustion engine, comprising:
   a fuel amount detector for detecting a remaining fuel amount in a fuel tank;
   a smoothing calculation portion that calculates a smooth output value, which is obtained by smoothing an output value of the fuel amount detector in a temporal direction, when a vehicle speed is in a lower speed region than a predetermined speed;
   a continuous low speed condition detection portion that detects a continuous low speed condition in which the vehicle speed remains in the low speed region continuously beyond a predetermined time period;
   a calculation processing portion that successively calculates a maximum value and a minimum value of the smooth output value throughout the continuous low speed condition from an engine start-up to an engine stoppage;
   a reference setting portion that updates and stores a reference value in response to the engine stoppage and in accordance with the current minimum value calculated by the calculation processing portion; and
   a fuel supply determination portion that detects a fuel supply to the fuel tank during the continuous low speed condition on the basis of a comparison between the maximum value calculated by the calculation processing portion and the reference value stored by the reference setting portion.

2. The control system according to claim 1, wherein the fuel supply determination portion detects a fuel supply to the fuel tank on the basis of a comparison between the maximum value and the minimum value calculated by the calculation processing portion when the continuous low speed condition is detected after the vehicle speed has temporarily reached or exceeded the predetermined speed following the engine start-up.

3. The control system according to claim 1, wherein the fuel supply determination portion detects a fuel supply to the fuel tank on the basis of a comparison between the current output value of the fuel amount detector and the reference value stored by the reference setting portion when the vehicle speed reaches or exceeds the predetermined speed following the engine start-up before the continuous low speed condition is detected.

4. The control system according to claim 1, further comprising an integration portion that integrates a fuel injection amount during an operation, wherein, when the continuous low speed condition is detected after the vehicle speed has reached or exceeded the predetermined speed following the engine start-up before the continuous low speed condition is detected, the fuel supply determination portion corrects the maximum value calculated by the calculation processing portion using a fuel injection amount integrated value calculated by the integration portion, and detects a fuel supply to the fuel tank on the basis of a comparison between the corrected maximum value and the reference value stored by the reference setting portion.

5. The control system according to claim 1, wherein the reference setting portion updates and stores the reference value in accordance with the current minimum value calculated by the calculation processing portion in response to an ignition switch being switched OFF, and the calculation processing portion temporarily initializes the maximum value and the minimum value in response to the ignition switch being switched ON.

* * * * *

UNITED STATES PATENT AND TRADEMARK OFFICE
CERTIFICATE OF CORRECTION

PATENT NO.         : 7,877,188 B2                                                Page 1 of 1
APPLICATION NO.    : 12/465194
DATED              : January 25, 2011
INVENTOR(S)        : Hiroyuki Mizuno et al.

It is certified that error appears in the above-identified patent and that said Letters Patent is hereby corrected as shown below:

Column 4, line 13 replace "HG" with --Fig.--
Column 5, line 45 replace "HG" with --Fig.--
Column 7, line 47 replace "HG" with --Fig.--
Column 9, line 52 replace "HG" with --Fig.--
Column 10, line 12 replace "HG" with --Fig.--
Column 11, line 64 replace "HG" with --Fig.--
Column 12, line 1 replace "HG" with --Fig.--

Signed and Sealed this
Thirteenth Day of September, 2011

David J. Kappos
*Director of the United States Patent and Trademark Office*